United States Patent [19]

Thompson

[11] 4,200,898
[45] Apr. 29, 1980

[54] CURRENT LIMITER

[75] Inventor: James P. Thompson, San Jose, Calif.

[73] Assignee: The United States of America as represented by the Secretary of the Navy, Washington, D.C.

[21] Appl. No.: 916,449

[22] Filed: Jun. 19, 1978

[51] Int. Cl.² .................................................. H02H 7/085
[52] U.S. Cl. .................................................. 361/58
[58] Field of Search ................. 323/1, 4, 9, 16, 22 R; 307/205, 235, 237, 251, 255, 279, 304, 296 R, 299 R, 351; 328/169, 162, 171; 361/58

[56] References Cited

U.S. PATENT DOCUMENTS

| | | | |
|---|---|---|---|
| B 501,181 | 2/1976 | Edington et al. | 323/22 T |
| 3,521,087 | 7/1970 | Lombardi | 323/9 |
| 3,603,811 | 9/1971 | Day et al. | 323/9 |
| 3,656,025 | 4/1972 | Roveti | 323/9 |
| 3,760,284 | 9/1973 | Matejka | 307/304 |
| 3,916,220 | 10/1975 | Roveti | 307/304 |
| 3,925,718 | 12/1975 | Wittlinger | 323/4 |
| 3,967,187 | 6/1976 | Edwards | 323/4 |

FOREIGN PATENT DOCUMENTS 44-24965 10/1969 Japan ....................................... 307/304

OTHER PUBLICATIONS

*FETs: Theory & Applications* Note No. 2, Jun. 1962, Amelco Semiconductor; pp. 1-7.
Navships 0967-000-D120, *Electronic Circuits*, pp. 13-16.
*Electronics*, Jan. 18, 1971, pp. 81-84.
*Electronic Design 12*, Jun. 7, 1976, p. 160.

*Primary Examiner*—A. D. Pellinen
*Attorney, Agent, or Firm*—R. S. Sciascia; Charles D. B. Curry; Francis I. Gray

[57] ABSTRACT

A current limiter for an a.c. circuit having two FET's connected source to drain. The FET's are biased for symmetrical bipolar operation with source resistors for self-biasing. In operation one FET operates as a source follower and the other as a current source.

11 Claims, 4 Drawing Figures

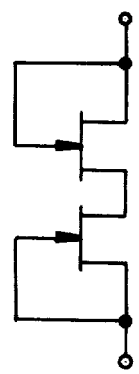
FIG_1
(PRIOR ART)
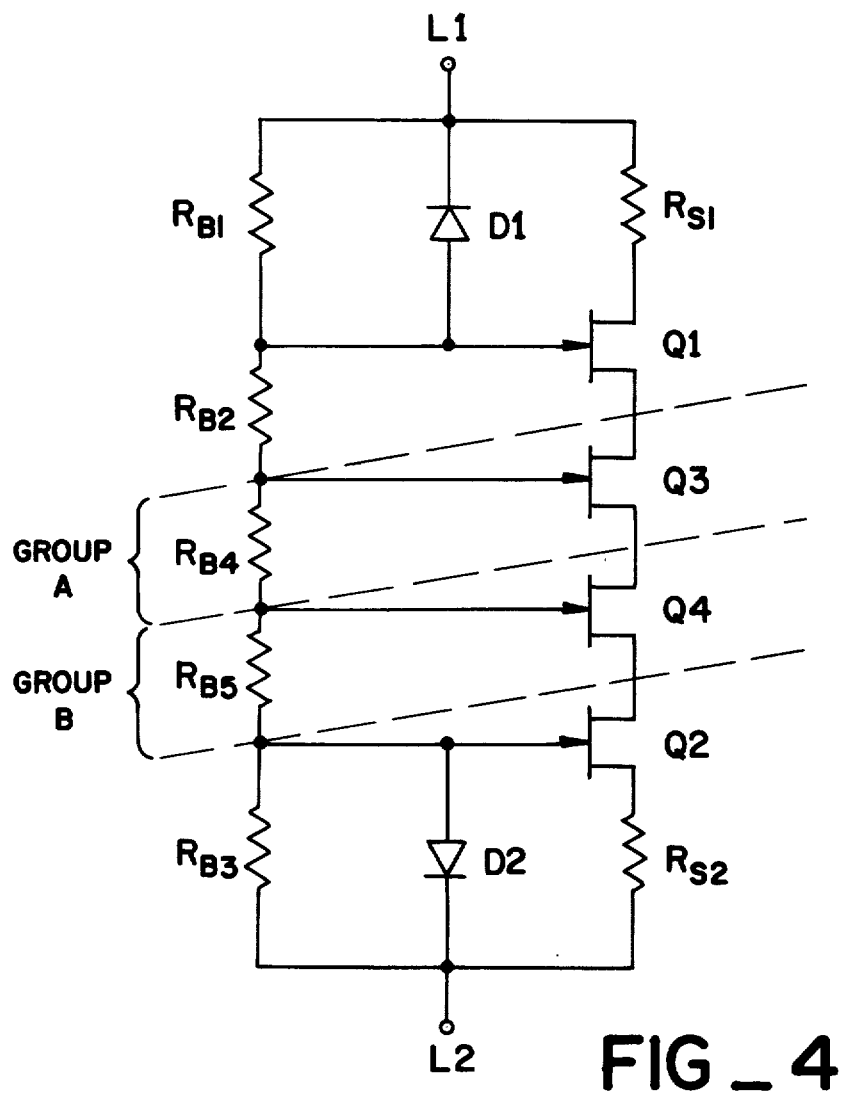
FIG_4

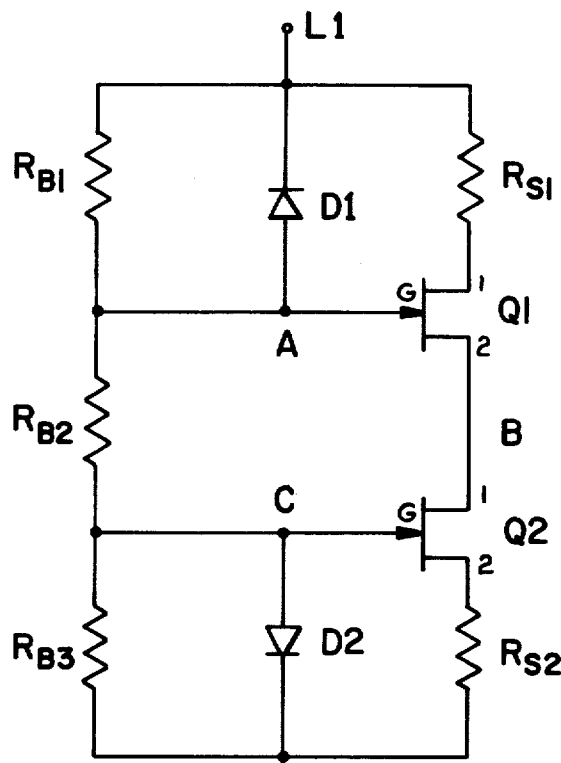
FIG_2
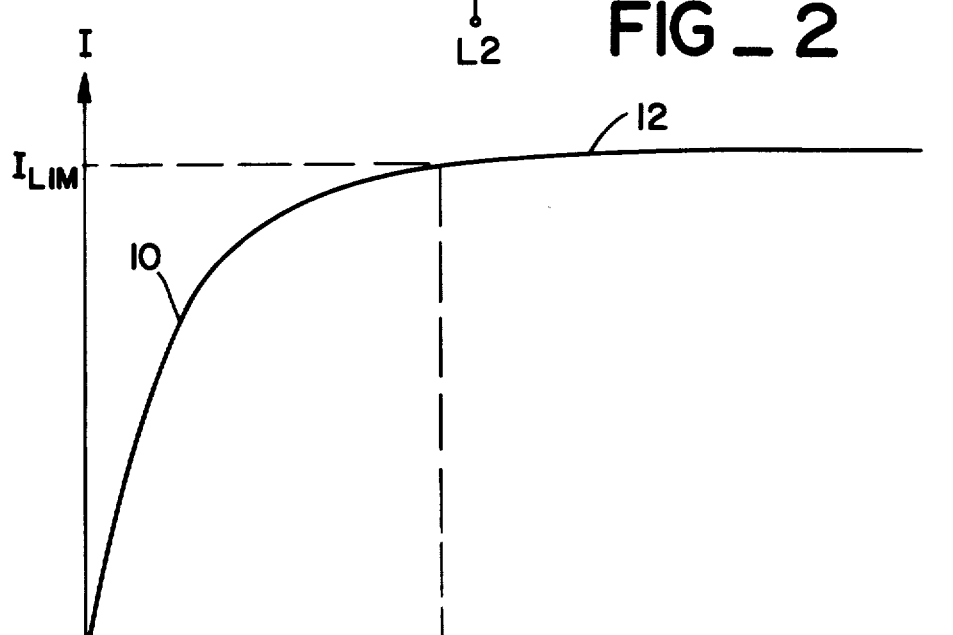
FIG_3

CURRENT LIMITER

BACKGROUND OF THE INVENTION

1. Field of the Invention

The present invention relates to current limiting circuits, and more particularly to an FET bipolar current limiter for an a.c. circuit.

2. Description of Prior Art

Prior current limiting devices used fuses, circuit breakers, discrete current limiting circuits requiring a custom current transformer, and FET current limiting circuits for low voltages having FET's connected in opposition with the gate and source electrodes connected together. The prior art FET circuit, shown in FIG. 1, has the disadvantage that it is very difficult to design FET current limiters with low resistances which are relatively independent of transistor characteristics, and at the same time have high breakdown voltages. The voltage rating is limited to that of a single FET since the saturation current ($I_{DSS}$) ratings are not matched.

SUMMARY OF THE INVENTION

Accordingly, the present invention provides a current limiter for an a.c. circuit to protect the power source from the effects of a failure, or short, in the load. Two FET's with $I_{DSS}$ ratings in excess of the desired peak short circuit current are connected in cascode, source to drain, with the opposite terminals connected via self-biasing resistors between the load and the power source, respectively. The FET's are biased via a series resistor network to which the gates are connected, with diodes connecting the gates to the load side and power source side, respectively, of the self-biasing resistors. In operation one FET operates as a source follower and the other as a current source.

Therefore, it is an object of the present invention to provide a current limiter for an a.c. circuit to protect a power source from a failure, or short, in the load.

Another object of the present invention is to provide a current limiter using FET's which can withstand high voltage levels without breakdown.

Other objects, advantages and novel features of the present invention will be apparent from the following detailed description when read in view of the appended claims and attached drawing.

BRIEF DESCRIPTION OF THE DRAWING

FIG. 1 is a schematic diagram of a prior art FET current limiter for low voltages.

FIG. 2 is a schematic diagram of a current limiter according to the present invention.

FIG. 3 is a graph of the performance characteristic of the circuit of FIG. 2.

FIG. 4 is a schematic diagram of another embodiment of the current limiter according to the present invention.

DESCRIPTION OF THE PREFERRED EMBODIMENT

Referring now to FIG. 2 two FET's Q1 and Q2, are connected in cascode by connecting terminal 2 of Q1 to terminal 1 of Q2. Terminal 1 of transistor Q1 is connected to resistor $R_{S1}$, and terminal 2 of transistor Q2 is connected to resistor $R_{S2}$. The other ends of resistors $R_{S1}$ and $R_{S2}$ are serially connected to the line at L1 and L2, respectively, between the load and the power source. A resistive voltage divider network of $R_{B1}$, $R_{B2}$ and $R_{B3}$ is also connected between L1 and L2, $R_B$ resistors being much larger than $R_S$ resistors. The gate of Q1 is connected at the junction of $R_{B1}$ and $R_{B2}$, and the gate of Q2 is connected at the junction of $R_{B2}$ and $R_{B3}$. Low current diodes D1 and D2 connect the gates of Q1 and Q2 to L1 and L2, respectively, with the anodes connected to the gates and the cathodes to the line, and act as switches to bypass resistors $R_{B1}$ and $R_{B3}$, respectively, to make the circuit appear symmetrical to either applied voltage polarity.

If L1 is positive, Q2 acts as a current source because the gate is held at approximately 0.6 volts, the forward bias voltage drop across D2, with respect to L2. Terminal 2 of Q2 acts as the source since the source and drain leads of FET's are essentially interchangeable. Q1 acts as a source follower, or unity gain buffer, and the voltage drop across Q1 is approximately equal to the voltage across $R_{B1}$, i.e., approximately one-half of the line voltage. Since the circuit is symmetrical, when L2 is positive Q1 becomes the current source with D1 forward biased and Q2 becomes the source follower, or unity gain buffer.

As long as the a.c. circuit is operating properly the current limiter circuit acts as a small resistance and its characteristic is shown by the linear portion 10 of the curve of FIG. 3. If a short occurs in the load, the entire power source voltage appears across the current limiting circuit which limits the total current to $I_{LIM}$ as shown by the level portion 12 of the curve. The value of $L_{LIM}$ is determined by the value of resistors $R_S$. Since the FET's are not matched, $I_{LIM}$ must be less than the lowest $I_{DSS}$ of either FET.

For an a.c. power source of 28 volts rms, peak voltage approximately 41.5 volts, the current source gate is held at 0.6 volts and the voltage across $R_S$ cannot be greater than $V_p$, the cutoff voltage for the FET, plus the gate voltage. With $R_S$ of 2 ohms, $R_B$ of 10 K Ω, and a desired limiting current of 425 ma, $V_{RS}$ is 0.85 volts. The voltage at the source follower gate is (41.5−0.6)/2, or 20.45 volts, and the total voltage maximum across either FET is 22.15 volts, well within the breakdown voltage of 30 volts for a Siliconix FN 3392 FET.

With matched FET's, i.e., the $I_{DSS}$ of each being equal such as can be obtained in integrated circuits as opposed to discrete components, $R_S$ could be reduced to virtually zero. However, if one FET cannot supply sufficient current to the other due to unmatched $I_{DSS}$, that FET becomes forward biased and starts to develop greater voltage across it until breakdown occurs. Thus, the value of $R_S$ is a trade-off between the desire for a small impedance circuit and the necessity for self-biasing with unmatched FETs.

FIG. 4 shows that for higher voltage applications groups of resistors and FETs, such as Group A ($R_{B4}$ and Q3) and Group B ($R_{B5}$ and Q4), can be strung together until the parasitic capacitance to ground starts to interfere with the circuit operation at the particular a.c. frequency. Therefore, with a peak voltage of 100 volts and Q2 as the current source each FET would drop approximately 25 volts, less than the individual breakdown voltages.

Thus, the present invention provides a current limiter for an a.c. circuit to protect a power source from a short in the load which can operate at voltages greater than the breakdown voltage of an individual FET.

What is claimed is:

1. A current limiter for an a.c. circuit comprising:
   (a) a first field effect transistor connected in series to the line side of said a.c. circuit;
   (b) a second field effect transistor connected in cascode to said first field effect transistor and in series to the load side of said a.c. circuit;
   (c) a plurality of resistors connected in series between the line side and the load side of said a.c. circuit to form a voltage divider network, the gates of said field effect transistors being connected at different points, respectively, of said voltage divider network; and
   (d) means for bypassing the portion of said voltage divider network between the gate and the terminal of each of said field effect transistors connected to said a.c. circuit so that said field effect transistors operate interchangeably as a current source depending upon the polarity of the applied voltage.

2. A current limiter as recited in claim 1 wherein said bypassing means comprises a low current diode for each of said first and second field effect transistors, said low current diode having the anode connected to the gate and the cathode connected to the terminal of said first and second field effect transistors which is connected to said a.c. circuit.

3. A current limiter as recited in claim 2 further comprising means for self-biasing said first and second field effect transistors, said self-biasing means being connected in series between one terminal of each and said a.c. circuit.

4. A current limiter as recited in claim 3 wherein said self-biasing means comprises a resistor having a value much smaller than that of any one of said resistors of said voltage divider network.

5. A current limiter for an a.c. circuit comprising:
   (a) a first solid state device having symmetrical characteristics connected in series to the line side of said a.c. circuit;
   (b) a second solid state device having symmetrical characteristics, said second solid state device being connected in cascode to said first solid state device and being connected in series to the load side of said a.c. circuit; and
   (c) means connected between the line and the load sides of said a.c. circuit for biasing said first and said second solid state devices so that said first and said second solid state devices act interchangeably as a current source and a unity gain buffer depending upon the polarity of the applied voltage so that the current of said a.c. circuit is limited by the saturation current of said solid state devices.

6. A current limiter as recited in claim 5 wherein said first solid state device comprises a first field effect transistor having one terminal connected in series with the line side of said a.c. circuit, having the gate connected to said biasing means, and having the second terminal connected to said second solid state device.

7. A current limiter as recited in claim 6 wherein said second solid state device comprises a second field effect transistor having one terminal connected to said first solid state device, having the gate connected to said biasing means, and having the second terminal connected in series with the load side of said a.c. circuit.

8. A current limiter as recited in claim 5 further comprising an intermediate solid state device having symmetrical characteristics connected in cascode between said first and said second solid state devices to provide current limiting at greater applied voltages.

9. A current limiter as recited in claim 8 wherein said first solid state device comprises a first field effect transistor having one terminal connected in series with the line side of said a.c. circuit, having the gate connected to said biasing means, and having the second terminal connected to one side of said intermediate solid state device.

10. A current limiter as recited in claim 9 wherein said second solid state device comprises a second field effect transistor having one terminal connected to the other side of said intermediate solid state device, having the gate connected to said biasing means, and having the second terminal connected in series with the line side of said a.c. circuit.

11. A current limiter as recited in claim 10 wherein said intermediate solid state device comprises at least one intermediate field effect transistor having the terminals connected in series between said first and second field effect transistors, and having the gate connected to said biasing means.

* * * * *